US012593838B2

(12) United States Patent
Saini et al.

(10) Patent No.: US 12,593,838 B2
(45) Date of Patent: Apr. 7, 2026

(54) STABLE AGROCHEMICAL COMPOSITION

(71) Applicant: UPL LTD, Mumbai (IN)

(72) Inventors: Anil Saini, Mumbai (IN); Luiz Campos, Mumbai (IN); Rajan Ramakant Shirsat, Mumbai (IN); Ritesh Pagare, Mumbai (IN)

(73) Assignee: UPL LTD, Mumbai (IN)

( * ) Notice: Subject to any disclaimer, the term of this patent is extended or adjusted under 35 U.S.C. 154(b) by 0 days.

(21) Appl. No.: 17/957,186

(22) Filed: Sep. 30, 2022

(65) Prior Publication Data

US 2023/0117137 A1 Apr. 20, 2023

(30) Foreign Application Priority Data

Oct. 1, 2021 (IN) .............................. 202121044726

(51) Int. Cl.

| | |
|---|---|
| *A01N 25/14* | (2006.01) |
| *A01N 25/30* | (2006.01) |
| *A01N 43/653* | (2006.01) |
| *A01N 43/707* | (2006.01) |
| *A01N 43/76* | (2006.01) |
| *A01N 43/90* | (2006.01) |
| *A01P 13/00* | (2006.01) |

(52) U.S. Cl.

CPC ............. *A01N 25/14* (2013.01); *A01N 25/30* (2013.01); *A01N 43/653* (2013.01); *A01N 43/707* (2013.01); *A01N 43/76* (2013.01); *A01N 43/90* (2013.01); *A01P 13/00* (2021.08)

(58) Field of Classification Search

CPC ...... A01N 25/14; A01N 25/30; A01N 43/653; A01N 43/707; A01N 43/76; A01N 43/90; A01N 47/38; A01N 25/08; A01N 43/80; A01N 43/84; A01P 13/00

See application file for complete search history.

(56) References Cited

U.S. PATENT DOCUMENTS

| | | | | | |
|---|---|---|---|---|---|
| 4,315,767 | A | * | 2/1982 | Wolf ................... | C07D 487/04 |
| | | | | | 504/225 |
| 8,785,351 | B2 | | 7/2014 | Mann et al. | |
| 2005/0026782 | A1 | | 2/2005 | Hacker et al. | |
| 2010/0311589 | A1 | | 12/2010 | Nakatani et al. | |
| 2012/0190547 | A1 | | 7/2012 | Liu | |
| 2020/0146291 | A1 | | 5/2020 | Delsantro et al. | |
| 2021/0137117 | A1 | * | 5/2021 | Menne ................... | A01N 43/80 |
| 2022/0272979 | A1 | | 9/2022 | Fabri et al. | |
| 2025/0143291 | A1 | | 5/2025 | Saini et al. | |

FOREIGN PATENT DOCUMENTS

| | | | |
|---|---|---|---|
| AU | 2015101156 | A4 | 10/2015 |
| CN | 101642122 | A | 2/2010 |
| CN | 101953373 | A | 1/2011 |

| | | | | | |
|---|---|---|---|---|---|
| CN | 102524278 | A | | 7/2012 | |
| CN | 103283779 | * | 9/2014 | ............. | A01N 57/20 |
| CN | 108849930 | A | | 11/2018 | |
| CN | 112514905 | A | | 3/2021 | |
| DE | 19501986 | A1 | | 7/1996 | |
| EP | 2296466 | A2 | | 3/2011 | |
| GB | 2562072 | A | | 11/2018 | |
| JP | 2018104337 | * | 7/2018 | ............. | A01N 33/18 |
| WO | 2009153246 | A2 | | 12/2009 | |
| WO | 2019142045 | A1 | | 7/2019 | |
| WO | 2020113301 | A1 | | 6/2020 | |
| WO | WO2021024221 | A1 | * | 2/2021 | ........... A01N 43/653 |
| WO | 2021151752 | A1 | | 8/2021 | |

OTHER PUBLICATIONS

Google translation Shen et al. CN103283779 B Sep. 24, 2014 (Year: 2014).*

Espacenet translation Yamazaki et al. JP2018104337A Jul. 5, 2018 (Year: 2018).*

Winowiski et al. (Journal of ASTM International, Jul./Aug. 2005, vol. 2, No. 7, Paper ID JAI12175) "The Effect of Dispersant Solubility, Dispersant Dosage, Granule Diameter, and Dome Versus Radial Extrusion on Granule Spontaneity of Disintegration and Resistance to Attrition" (Year: 2005).*

Xonerate 70 WDG Herbicide Safety Data Sheet (FMC Corporation, 2016, p. 1-8) (Year: 2016).*

Colby, S.; "Calculating Synergistic and Antagonistic Responses of Herbicide Combinations"; Weeds, vol. 15, Issue No. 1; 1967; pp. 20-22.

First Examination Report for India Application No. 202121044726; Date of Mailing: Apr. 8, 2024, 8 pages.

International Search Report and Written Opinion for International Application PCT/IB2020/07441; International Filing Date: Aug. 6, 2020; Date of Mailing: Jan. 11, 2021; 13 pages.

Meyer et al., "Antagonism in mixtures of glufosinate + glyphosate and glufosinate +clethodim on grasses", Weed Technology, vol. 35, 2021; pp. 12-21.

Office Action for Chile Application No. 202400919, Dated: Sep. 1, 2025; 12 pages.

Office Action for Chile Application No. 202401013, Dated: Aug. 18, 2025; 15 pages.

(Continued)

*Primary Examiner* — Ali Soroush
*Assistant Examiner* — Karen Ketcham
(74) *Attorney, Agent, or Firm* — CANTOR COLBURN LLP

(57) ABSTRACT

The present invention discloses a stable agrochemical composition comprises at least one triazolone herbicide or a derivative thereof; and a dispersion aid comprising at least one interface additive and a high surface hydrophilicity inert. The present invention also discloses process of preparing stable agrochemical composition, method of controlling weeds using stable agrochemical composition developed according to the present invention.

14 Claims, No Drawings

(56)         References Cited

OTHER PUBLICATIONS

Search Report for Chile Application No. 202400919, Dated: Sep. 1, 2025; 3 pages.
Search Report for Chile Application No. 202401013, Dated: Aug. 18, 2025; 3 pages.
Takano et al., "Glufosinate enhances the activity of protoporphyrinogen oxidaseinhibitors", Weed Science, vol. 68, 2020; pp. 324-332.

* cited by examiner

STABLE AGROCHEMICAL COMPOSITION

CROSS-REFERENCE TO RELATED APPLICATIONS

This application claims priority to Indian Application No. 202121044726 filed on Oct. 1, 2021, which is incorporated herein by reference in its entirety.

FIELD OF THE INVENTION

The present disclosure relates to an agrochemical composition of triazolone herbicide. The present disclosure more particularly relates to an agrochemical composition of triazolone herbicide in the form of water dispersible granules.

BACKGROUND

Agrochemical formulations are generally formulated as liquid formulations and applied by spraying. To meet the demand for a reduction in the risk to the end user, solid formulations are attractive because the active agrochemical in a solid formulation is immobilised, and solid formulations are of higher density than liquid formulations.

Granules being the solid formulation, are produced to enhance the uniformity of the active ingredient in the final product, to increase the density of the blend so that it occupies less volume per unit weight for better storage and shipment, to facilitate metering or volumetric dispensing, to reduce dust during granulation process to reduce toxic exposure and process-related hazards, and to improve the appearance of the product. Consequently, the ideal characteristics of granules include narrow particle size distribution for content uniformity and volumetric dispensing, sufficient fines to fill void spaces between granules for better compaction and compression characteristics, and adequate moisture and hardness to prevent breaking.

Widely acceptable granular formulations, water dispersible granules (WDGs) are wettable powders that have been aggregated into uniform granules size for easier handling and to eliminate respirable particles. They are dispersed in the spray tank and applied as dilute suspensions in the same way as wettable powders. WDGs incorporate the same ingredients as wettable powders, including dispersants and clay, although generally with a higher level of active and less diluent. The granules must be strong enough to resist crumbling into powder, yet readily and completely disintegrate and disperse in the spray tank. This avoids nozzle clogging and ensures the finest particle size of the active ingredient for optimum efficacy.

Typically, the granules are made by mixing the formulation components including sufficient water to form a paste having suitable rheology for granulation, forming granules from the mixture, and then drying the granules.

Several methods are used to form WDGs from the starting powder blend. These include pan granulation, fluid bed granulation, spray drying, high speed mixer agglomeration and extrusion granulation. Powder granular formulations can be converted into granules of larger particle size by such processing methods or by adding moderate amount of water to the powder and mixing the powder to agglomerate to form larger granules.

In extrusion granulation, the formulation will usually be made up as a pasty material that can be readily extruded typically to give spaghetti like strands which are usually subsequently broken up into granules e.g., during drying.

In fluidized bed granulation, a mixture of the powdered components is fluidized in a fluidized bed and the mixture is sprayed with an aqueous mixture or solution of the liquid components. The particles agglomerate in the bed to form granules which are dried in the bed.

In pan granulation, the solids are tumbled in a rotating inclined vessel and the liquid components are sprayed on the particles which agglomerate to form granules which are dried either in the vessel or subsequently, for example in a fluidized bed drier. In spray drying, a flowable slurry or a solution of all the components of the formulation is made and passed to a spray drier where the slurry or solution is atomised and dried. If necessary, a desired size range of particles is selected from the spray dried product and/or the product can be agglomerated for example in a fluidized bed, to form a granulate of the desired particle size range.

Extrusion granulation is generally preferred on the basis of safety, versatility and economy. They are becoming more popular because of their convenience in packaging and use, capable of high a.i. loading (50-90%), being non-dusty, free flowing that disperse quickly when added to water in the spray tank.

It is also desirable that the water dispersible granule form of the agrochemical formulation to have good dispersibility as well as suspensibility.

To obtain desirable dispersibility and suspensibility of WDG formulation upon dilution, choice of surfactants and fillers play a critical role.

Surfactants play several roles during the preparation of the formulation and condition the final performances of the granules. Their roles include to: (a) help the blending and the extrusion by reducing the friction forces (binding and lubricant effect); (b) provide wettability to the particles of the active ingredient; (c) decreases the interfacial tension between the solid active ingredient (which is mostly hydrophobic) and water; and (d) provide stabilization by giving cohesion to the system.

Similarly, fillers or inert carriers have a role to adjust the composition and to improve its performances. Such materials may be added as porous carriers, as moisture inhibition agents, to aid binding or agglomeration properties of a formulation or simply to fill a formulation to a convenient weight. Examples of such fillers may include natural silicates such as diatomaceous earth, synthetic precipitated silicas, clays such as kaolin, attapulgites and bentonites, zeolites, titanium dioxide, iron oxides and hydroxides, aluminium oxides and hydroxides, and organic materials such as bagasse, charcoal, and synthetic organic polymers.

Although attempts have been made in the prior art to prepare triazolone herbicides based granular formulations but still need exist for stable granular preparations with excellent suspensibility and dispersibility.

SUMMARY

An objective of the present disclosure is to provide an agrochemical composition comprising triazolone herbicide or a derivative thereof.

Another objective of the present disclosure is to provide an agrochemical composition comprising triazolone herbicide or a derivative thereof in the form of water dispersible granules.

Another objective of the present disclosure is to provide an agrochemical composition comprising triazolone herbicide or a derivative thereof in combination with other active ingredients in the form of water dispersible granules.

Another objective of the present disclosure is to provide an agrochemical composition comprising triazolone herbicide or a derivative thereof with improved suspensibility and greater dispersibility.

Another objective of the present invention is to provide a process of preparing an agrochemical composition comprising triazolone herbicide.

Still another objective of the present disclosure is to provide a method of controlling pests using an agrochemical composition comprising triazolone herbicide or a derivative thereof.

In an aspect of the present invention, an agrochemical composition comprises:
   a) at least one triazolone herbicide or a derivative thereof; and
   b) a dispersion aid comprising at least one interface additive and a high surface hydrophilicity inert.

In another aspect of the present invention, an agrochemical composition comprises:
   a) at least one triazolone herbicide or a derivative thereof;
   b) at least one additional active ingredient or derivatives thereof; and
   c) a dispersion aid comprising at least one interface additive and a high surface hydrophilicity inert.

In another aspect of the present invention, an agrochemical composition comprises:
   a) at least one triazolone herbicide or a derivative thereof;
   b) at least one additional active ingredient comprising isoxazole, dicarboximide, N-phenylimide and/or triazinone herbicides or derivatives thereof; and
   c) a dispersion aid comprising at least one interface additive and a high surface hydrophilicity inert.

In yet another aspect of the present disclosure, an agrochemical composition comprises:
   a) at least one triazolone herbicide or a derivative thereof;
   b) at least one additional active ingredient comprising isoxazole, dicarboximide, N-phenylimide and/or triazinone herbicides or derivatives thereof; and
   c) a dispersion aid comprising at least one interface additive comprising salts of sulphonic acid derivatives and a high surface hydrophilicity inert.

In an aspect of the present disclosure, a process of preparing an agrochemical composition comprises:
   (i) mixing triazolone herbicide or a derivative thereof and dispersion aid to obtain a homogeneous mixture;
   (ii) obtaining granules from the homogeneous mixture; and
   (iii) drying the granules to obtain an agrochemical composition.

An aspect of the present invention discloses a method of controlling weeds comprising applying to the plants or to their locus, an agrochemical composition comprising at least one triazolone herbicide or a derivative thereof, a dispersion aid comprising at least one interface additive and a high surface hydrophilicity inert, and optionally an additional active ingredient.

An aspect of the present invention discloses use of an agrochemical composition for controlling weeds wherein the composition comprises of at least one triazolone herbicide or a derivative thereof; a dispersion aid comprising at least one interface additive and a high surface hydrophilicity inert, and optionally an additional active ingredient.

An aspect of the present invention discloses a kit-of-parts comprising an agrochemical composition of at least one triazolone herbicide or a derivative thereof, a dispersion aid comprising at least one interface additive and a high surface hydrophilicity inert, and optionally at least one additional active ingredient.

DETAILED DESCRIPTION

Inventors of the present disclosure found that the granular preparation in the form of water dispersible granules (WDG) can be prepared through extrusion process by using a unique combination of an interface additive and a high surface hydrophilicity inert. The interface additives facilitate easy and quick dispersion of granules once diluted with water and the high surface hydrophilicity inerts such as inorganic salts, clay, bentonite, kaolin remain in suspension and do not settle down immediately.

Salts of sulphonic acid derivatives (interface additives) not only act upon dilution, but they also ease preparation of dough of active ingredients. This makes granulation much easier. Careful selection of salts of aryl sulfonic acid and inerts with high surface hydrophilicity was found effective in dispersing the active ingredients in water. The salts of aryl sulphonic acid facilitate granules breaking once it is added to water and high surface hydrophilicity inerts facilitate quick wetting of the active ingredient.

Unless defined otherwise, all technical and scientific terms used herein have the same meaning as commonly understood by one of ordinary skill in the art to which this disclosure belongs. It must be noted that, as used in this specification, the singular forms "a," "an" and "the" include plural referents unless the content clearly dictates otherwise.

As used herein, the terms "comprising" "including." "having." "containing," "involving." and the like are to be understood to be open-ended, i.e., to mean including but not limited to. The terms "preferred" and "preferably" refer to embodiments of the disclosure that may afford certain benefits, under certain circumstances.

As used herein the term 'stable' refers to the chemical and/or physical stabilization of an active compound, i.e., a herbicide in terms of achieving chemical stability of the active ingredient and desired suspensibility of the composition, wherein the reduction in the concentration of the active content is not more than about 5%.

As used herein, the term 'interface additives' refers to ionic substances that lower the surface tension or interfacial tension between an agrochemical ingredient and a solvent/a diluent. Such interface additives facilitate quicker wetting of the agrochemical ingredients.

As used herein, the term 'high surface hydrophilicity' refers to a property of inert carriers that quickly disperse (within 1 to 20 seconds) in water despite of being hydrophobic or hydrophilic.

The aspects and embodiments described herein shall also be interpreted to replace the clause "comprising" with either "consisting of" or with "consisting essentially of" or with "consisting substantially of".

The term "about" or "approximately" as used herein is inclusive of the stated value and means within an acceptable range of deviation for particular value as determined by one of ordinary skill in the art, considering the measurement in question and the error associated with measurement of the particular quantity (i.e., the limitations of the measurement system). For example, "about" can mean within one or more standard deviations, or within ±10 or ±5 of the stated value. Recitation of ranges of values are merely intended to serve as a shorthand method of referring individually to each separate value falling within the range, unless otherwise indicated herein, and each separate value is incorporated into the specification as if it were individually recited herein. The endpoints of all ranges are included within the range and independently combinable. It is understood that where a parameter range is provided, all integers within that range, and tenths thereof, are also provided. For example, "0.1-80%" includes 0.1%, 0.2%, 0.3%, etc. up to 80%.

The terms "plants" and "vegetation" include, but are not limited to, germinant seeds, emerging seedlings, plants emerging from vegetative propagules, and established vegetation. The term "locus" as used herein shall denote the vicinity of a desired crop in which weed control, typically selective weed control, of weeds is desired. The locus includes the vicinity of desired crop plants wherein the weed infestation has either emerged or is yet to emerge. The term crop shall include a multitude of desired crop plants or an individual crop plant growing at a locus.

Therefore, according to an aspect of the present disclosure, an agrochemical composition comprises:

a) at least one triazolone herbicide or a derivative thereof; and b) a dispersion aid comprising at least one interface additive and a high surface hydrophilicity inert.

The examples of derivatives of a triazolone herbicide and other active ingredients include salts, isomers, polymorphs and esters.

According to an embodiment of the present disclosure, the triazolone herbicide is selected from amicarbazone, bencarbazone, carfentrazone, flucarbazone, flucarbazone sodium, ipfencarbazone, propoxycarbazone, sulfentrazone, thiencarbazone or a derivative thereof or a combination thereof.

According to an embodiment, the triazolone herbicide is amicarbazone.

According to an embodiment of the present disclosure, a stable agrochemical composition comprises:

a) at least one triazolone herbicide or a derivative thereof; and b) a dispersion aid comprising at least one interface additive and a high surface hydrophilicity inert.

According to an embodiment of the present disclosure, the composition comprises from about 1% w/w to about 90% w/w triazolone herbicide or a derivative thereof of the total weight of the composition.

According to an embodiment of the present disclosure, the composition comprises from about 10% w/w to about 85% w/w triazolone herbicide or a derivative thereof of the total weight of the composition.

In a preferred embodiment of the present disclosure, the composition comprises from about 20% w/w to about 80% w/w triazolone herbicide or a derivative thereof of the total weight of the composition.

According to an embodiment of the present disclosure, the composition comprises a dispersion aid.

According to an embodiment of the present disclosure, the dispersion aid comprises at least one interface additive and a high surface hydrophilicity inert.

According to an embodiment of the present disclosure, the dispersion aid comprises at least one interface additive, at least one anionic surfactant and at least one high surface hydrophilicity inert.

According to an embodiment of the present disclosure, the dispersion aid comprises at least two interface additives, at least one anionic surfactant and at least one high surface hydrophilicity inert.

According to an embodiment of the present disclosure, the interface additive comprises salts of sulfonic acid derivatives.

According to an embodiment of the present disclosure, the interface additive comprises salts of alkyl sulfonic acid derivatives.

According to an embodiment of the present disclosure, the interface additive comprises salts of aryl sulfonic acid derivatives.

According to an embodiment of the present disclosure, the interface additive comprises sodium salt of a C8-C18 alkyl aryl sulfonic acid.

According to an embodiment of the present disclosure, the interface additive comprises esters of C8-C18 alkyl aryl sulfonic acid.

According to an embodiment of the present disclosure, the interface additive comprises alkyl naphthalene sulfonates, preferably having alkyl groups with 1-10 carbon atoms, such as methyl, isopropyl, n-butyl, sec-butyl, and nonyl; for example, sodium dodecylbenzenesulfonate, sodium lauryl sulfate, calcium dioctyl naphthalene sulfonate, linear dodecylbenzene sulfonic acid, branched dodecylbenzene sulfonic acid, linear dodecylbenzene sulfonate isopropylamine salt, sodium butyl naphthalene sulfonate and sodium nonyl naphthalene sulfonate. The naphthalene sulfonate-formaldehyde condensate or alkyl naphthalene sulfonate-formaldehyde condensate to be used in the compositions is preferably a sodium salt having a mean molecular weight of 300 to 2,000, preferably 400 to 1,000 and most preferably 500-750. Such as naphthalene sulfonate-formaldehyde condensates, alkyl substituted naphthalene sulfonate-formaldehyde condensates, sodium alkyl naphthalene sulfonate and methylene-linked condensation product of arylsulphonic acid, sodium butyl & dibutyl naphthalene sulfonate, sodium diisopropyl naphthalene sulfonate and sodium salt of sulfonated naphthalene-formaldehyde condensate. Some of the commercially available sulphonic acid derivatives are baykanol SLTM, rhodacal BX-78TM, supragyl WPTM, Morwet D-400, borresperse NA and the like.

According to an embodiment of the present disclosure, the composition comprises from about 0.1% w/w to about 25% w/w interface additive of the total weight of the composition.

According to an embodiment of the present disclosure, the composition comprises from about 1% w/w to about 20% w/w interface additive of the total weight of the composition.

In a preferred embodiment of the present disclosure, the composition comprises from about 5% w/w to about 15% w/w interface additive of the total weight of the composition.

According to an embodiment of the present disclosure, the dispersion aid comprises at least one high surface hydrophilicity inert.

According to an embodiment of the present disclosure, the high surface hydrophilicity inert comprises of inorganic salts.

According to an embodiment of the present disclosure, the high surface hydrophilicity inert comprises treated and untreated clays.

According to an embodiment of the present disclosure, the high surface hydrophilicity inert comprises clays such as kaolin, china clay and bentonite clays, which may be natural bentonites or modified bentonites, synthetic and diatomaceous silicas, calcium and magnesium silicates, titanium dioxide, aluminium, calcium or magnesium carbonate, ammonium sulfate, sodium sulfate, potassium sulfate, calcium sulfate or barium sulfate, charcoal, starch, including modified starches such as alkyl and carboxyalkyl starches and mixtures.

According to an embodiment of the present disclosure, the high surface hydrophilicity inert is ammonium sulfate.

According to an embodiment of the present disclosure, the high surface hydrophilicity inert is kaolin.

According to an embodiment of the present disclosure, the high surface hydrophilicity inert is china clay.

According to an embodiment of the present disclosure, the composition comprises from about 1% w/w to about 70% w/w high surface hydrophilicity inert of the total weight of the composition.

According to an embodiment of the present disclosure, the composition comprises from about 5% w/w to about 60% w/w high surface hydrophilicity inert of the total weight of the composition.

In a preferred embodiment of the present disclosure, the composition comprises from about 10% w/w to about 50% w/w high surface hydrophilicity inert of the total weight of the composition.

According to an embodiment of the present disclosure, an agrochemical composition comprises:
a) at least one triazolone herbicide,
b) at least one additional active ingredient; and
c) a dispersion aid comprising at least one interface additive and a high surface hydrophilicity inert.

According to an embodiment of the present disclosure, an agrochemical composition comprises:
a) at least one triazolone herbicide,
b) at least one additional active ingredient;
c) a dispersion aid comprising at least one interface additive and a high surface hydrophilicity inert; and
d) at least one agrochemically acceptable ingredient.

According to an embodiment of the present disclosure, a stable agrochemical composition comprises:
a) at least one triazolone herbicide,
b) at least one additional active ingredient; and
c) a dispersion aid comprising at least one interface additive and a high surface hydrophilicity inert.

According to an embodiment of the present disclosure, the additional active ingredients comprise herbicides as classified by Herbicide Resistance Action Committee (HRAC).

According to an embodiment of the present disclosure, the additional active ingredients comprise Group-1 herbicides comprising Acetyl Coenzyme A Carboxylase (AC-Case) inhibitor including aryloxyphenoxypropionate such as fenoxafop, fluazifop, quizalofop; phenylpyrazolin herbicides and cyclohexenedione herbicides such as clethodim and sethoxydim or combinations thereof.

According to an embodiment of the present disclosure the additional active ingredients comprise Group-2 herbicide comprising Acetolactate Synthase (ALS) inhibitors including imidazolinones, pyrimidinylthiobenzoates, sulfonylaminocarbonyltriazolinones, sulfonylureas, and triazolopyrimidines class herbicides or combinations thereof.

According to an embodiment of the present disclosure the additional active ingredients comprise Group-3 herbicides comprising Root growth inhibitors including benzamide, benzoic acid [dimethyl-2,3,5,6-tetrachloroterephthalate (DCPA), dinitroaniline, phosphoramidate, and pyridine class herbicides or combinations thereof.

According to an embodiment of the present disclosure additional active ingredients comprise Group-4 herbicides comprising Plant growth regulators including phenoxycarboxylic acid, pyridine carboxylic acid, and quinoline carboxylic acid class herbicides or combinations thereof.

According to an embodiment of the present disclosure additional active ingredients comprise Group-5, 6, and 7 herbicides comprising Photosystem-II inhibitors including triazine, triazinone (e.g., metribuzin), phenylcarbamates, pyridazinones, uracils, nitriles, benzothiadiazinones, phenylpyridazines, phenyl urea and amides class herbicides or combinations thereof.

According to an embodiment of the present disclosure additional active ingredients comprises Group-8 and Group-15 herbicides comprising shoot-growth inhibitors including phosphorodithioates and thiocarbamates and inhibit the biosynthesis of lipids, fatty acids, proteins, isoprenoids, flavonoids, and gibberellins; chloroacetamide, acetamide, oxyacetamide, and tetrazolinone class herbicides or combinations thereof.

According to an embodiment of the present disclosure additional active ingredients comprise Group-9 herbicides comprising aromatic amino acid inhibitors including glyphosate, which is generally available as ammonium salt, diammonium salt, dimethylammonium salt, isopropylamine salt, as well as potassium salt or combinations thereof.

According to an embodiment of the present disclosure additional active ingredients comprise Group-10 herbicides comprising glutamine-synthesis inhibitors including glufosinate, L-glufosinate or salts thereof of or esters thereof or derivative thereof. Preferably the salts of glufosinate or L-glufosinate include ammonium salt, diammonium salt, dimethylammonium salt, isopropylamine salt, as well as potassium salt or combinations thereof.

According to an embodiment of the present disclosure additional active ingredients comprise Groups-12, 13, and 27 herbicides comprising Pigment synthesis inhibitors including amides, anilidex, furanones, phenoxybutanamides, pyridiazinones, pyridines; Isoxazolidinone, Isoxazole (isoxaflutole), oxazole class herbicides or combinations thereof.

According to an embodiment of the present disclosure additional herbicides comprise Group-14 herbicides comprising PPO inhibitors including diphenylether, aryl triazolinone, N-phenylimide or dicarboxamide (e.g., flumioxazin), oxadiazoles, oxazolidinediones, phenylpyrazoles, pyrimidindiones, thiadiazoles class herbicides or combinations thereof.

According to an embodiment of the present disclosure additional herbicides comprise Group 22 comprising Photosystem-I inhibitors including bipyridilium class herbicides or combinations thereof.

According to an embodiment of the present disclosure the additional herbicide is metribuzin, a Group-5 herbicide or combinations thereof.

According to an embodiment of the present disclosure the additional herbicide is flumioxazin, a Group-14 herbicide or combinations thereof.

According to an embodiment of the present disclosure the additional herbicide is isoxaflutole, a Group-27 herbicide or combinations thereof.

According to another embodiment of the present disclosure, an agrochemical composition comprising:
a) at least one triazolone herbicide or a derivate thereof,
b) at least one additional active ingredient selected from the group comprising of isoxazole, N-phenylimide and/or triazinone herbicides; and
c) a dispersion aid comprising at least one interface additive and a high surface hydrophilicity inert.

According to another embodiment of the present disclosure, a stable agrochemical composition comprising:

a) at least one triazolone herbicide or a derivate thereof, b) at least one additional active ingredient selected from the group comprising of isoxazole, N-phenylimide and/or triazinone herbicides; and c) a dispersion aid comprising at least one interface additive and a high surface hydrophilicity inert.

According to an embodiment of the present disclosure, additional active ingredient is selected from the group comprising of isoxazole herbicides is isoxaflutole and isoxachlortole.

According to a preferred embodiment of the present disclosure, additional active ingredient in combination with at least one triazolone herbicide or a derivate thereof is Isoxaflutole or a derivative thereof.

According to an embodiment of the present disclosure, additional active ingredients is selected from flumezin, flumioxazin, saflufenacil, flumiclorac or flumipropyn or derivates thereof.

According to a preferred embodiment of the present disclosure additional active ingredient in combination with at least one triazolone herbicide or a derivate thereof is flumioxazin or a derivate thereof.

According to an embodiment of the present disclosure additional ingredients are selected from amibuzin, hexazinone, metribuzin, metamitron, trifludimoxazin or derivates thereof.

According to an embodiment of the present disclosure additional herbicide is metribuzin or a derivate thereof.

According to an embodiment of the present disclosure, the composition comprises from about 1% w/w to about 60% w/w and preferably from about 5% w/w to about 50% w/w additional herbicides or derivates thereof of the total weight of the composition.

According to an embodiment of the present disclosure, the composition comprises from about 5% w/w to about 50% w/w additional herbicides or derivates thereof of the total weight of the composition.

In a preferred embodiment of the present disclosure, the composition comprises from about 10% w/w to about 45% w/w additional herbicides or derivates thereof of the total weight of the composition.

According to an embodiment of the present disclosure, the composition comprises:

a) at least one triazolone herbicide or a derivate thereof;

b) at least one additional active ingredient selected from the group comprising of isoxazole, N-phenylimide and/or triazinone herbicides or derivatives thereof; and c) a dispersion aid comprising at least one interface additive selected from salts of alkyl or aryl sulphonic acid and a high surface hydrophilicity inert.

According to an embodiment of the present disclosure, dispersion aid comprises at least one interface additive selected from salts of sulphonic acid derivative and a high surface hydrophilicity inert.

According to an embodiment of the present disclosure, dispersion aid comprises at least one interface additive comprising salts of a C8-C18 alkyl aryl sulfonic acid and a high surface hydrophilicity inert.

According to an embodiment of the present disclosure, dispersion aid comprises sodium lauryl sulfate and kaolin.

According to an embodiment of the present disclosure, dispersion aid comprises sodium diisopropyl naphthalene sulfonate and ammonium sulfate.

According to an embodiment of the present disclosure, dispersion aid comprises sodium butyl & dibutyl naphthalene sulfonate and ammonium sulfate.

According to an embodiment of the present disclosure dispersion aid, comprises alkyl naphthalene sulfonate formaldehyde condensate and ammonium sulfate.

According to an embodiment of the present disclosure, the interface additive, and the high surface hydrophilicity inert in the dispersion aid are present in ratio from about 1:5 to 5:1.

According to an embodiment of the present disclosure, the interface additive, and the high surface hydrophilicity inert in the dispersion aid are present in ratio from about 1:4 to 4:1.

According to an embodiment of the present disclosure, the interface additive, and the high surface hydrophilicity inert in the dispersion aid are present in ratio from about 1:3 to 3:1.

According to an embodiment of the present disclosure, the interface additive, and the high surface hydrophilicity inert in the dispersion aid are present in ratio from about 1:2 to 1:1.

According to an embodiment of the present disclosure, the interface additive, and the high surface hydrophilicity inert in the dispersion aid are present in about 1:1 ratio.

According to an embodiment of the present disclosure, the interface additive, and the high surface hydrophilicity inert in the dispersion aid are present in about 1:1.5 ratio.

According to an embodiment of the present disclosure, the composition further comprises the agrochemically suitable excipient.

The agrochemically suitable excipient may be any one or a combination of adjuvants, co-solvents, surfactants, colorants, dispersants, emulsifiers, thickeners, antifreeze agents, biocides, anti-foam agents, stabilizers, wetting agents or a mixture thereof which may be optionally added to the compositions of the present invention.

According to an embodiment of the present disclosure, the anionic surfactants are selected from the group comprising of salts of lignosulfonates such as sodium lignosulfonate, sodium sulfite lignosulfonate kraft lignin sulphonate, alkyl or aryl ethoxylates, alkyl or aryl ethoxylate derivatives, and styrene acrylic polymers.

According to an embodiment of the present disclosure, the composition comprises from about 0.1% w/w to about 25% w/w and preferably from about 0.5% w/w to about 20% w/w anionic surfactants of the total weight of the composition.

In a preferred embodiment of the present disclosure, the composition comprises from about 1% w/w to about 15% w/w anionic surfactants of the total weight of the composition.

According to an embodiment of the present disclosure, the composition further comprises non-ionic surfactants.

According to an embodiment of the present disclosure, the non-ionic surfactants are selected from the group comprising of alcohol alkoxylates e.g., ethoxylates, particularly of C1 to C20 alcohols which can be linear, branched, or linear/branched mixtures; alkylamine alkoxylates, sorbitol and sorbitan fatty acid, particularly C to C20 fatty acid, esters and their ethoxylated derivatives; ethylene oxide propylene oxide block copolymers.

According to an embodiment of the present disclosure, the composition comprises from about 0.1% w/w to about 25% w/w and preferably from about 0.5% w/w to about 20% w/w non-ionic surfactants of the total weight of the composition.

In a preferred embodiment of the present disclosure, the composition comprises from about 1% w/w to about 15% w/w non-ionic surfactants of the total weight of the composition.

According to an embodiment of the present disclosure, the composition further comprises one or more of disintegrant, binder, glidant, anticaking agents, pH-regulating agents, preservatives, biocides, antifoaming agents, colorants, stabilizers and other formulation aids.

Emulsifiers which can be advantageously employed herein can be readily determined by those skilled in the art and include various non-ionic, anionic, cationic and amphoteric emulsifiers, or a blend of two or more emulsifiers. Examples of nonionic emulsifiers useful in preparing the emulsifiable concentrates include the polyalkylene glycol ethers and condensation products of alkyl and aryl phenols, aliphatic alcohols, aliphatic amines or fatty acids with ethylene oxide, propylene oxides such as the ethoxylated alkyl phenols and carboxylic esters solubilized with the polyol or polyoxyalkylene. Cationic emulsifiers include quaternary ammonium compounds and fatty amine salts. Anionic emulsifiers include the oil-soluble salts (e.g., calcium) of alkylaryl sulfonic acids, oil-soluble salts or sulfated polyglycol ethers and appropriate salts of phosphated polyglycol ether.

In an embodiment, colorants may be selected from iron oxide, titanium oxide and Prussian Blue, and organic dyestuffs, such as alizarin dyestuffs, azo dyestuffs or metal phthalocyanine dyestuffs, and trace elements, such as salts of iron, manganese, boron, copper, cobalt, molybdenum and zinc.

Another embodiment involves addition of a thickener or binder which may be selected from but not limited to molasses, granulated sugar, alginates, karaya gum, jaguar gum, tragacanth gum, polysaccharide gum, mucilage, xanthan gum or combination thereof. In another embodiment, the binder may be selected from silicates such as magnesium aluminium silicate, polyvinyl acetates, polyvinyl acetate copolymers, polyvinyl alcohols, polyvinyl alcohol copolymers, celluloses, including ethylcelluloses and methylcelluloses, hydroxymethyl celluloses, hydroxypropylcelluloses, hydroxymethylpropyl-celluloses, polyvinylpyrolidones, dextrins, malto-dextrins, polysaccharides, fats, oils, proteins, gum arabics, shellacs, vinylidene chloride, vinylidene chloride copolymers, calcium lignosulfonates, acrylic copolymers, starches, polyvinylacrylates, zeins, gelatin, carboxymethylcellulose, chitosan, polyethylene oxide, acrylimide polymers and copolymers, polyhydroxyethyl acrylate, methylacrylimide monomers, alginate, ethylcellulose, polychloroprene and syrups or mixtures thereof; polymers and copolymers of vinyl acetate, methyl cellulose, vinylidene chloride, acrylic, cellulose, polyvinylpyrrolidone and polysaccharide; polymers and copolymers of vinylidene chloride and vinyl acetate-ethylene copolymers; combinations of polyvinyl alcohol and sucrose; plasticizers such as glycerol, propylene glycol, polyglycols.

In another embodiment, antifreeze agent(s) added to the composition may be alcohols selected from the group comprising of but not limited to ethylene glycol, 1,2-propylene glycol, 1,3-propylene glycol, 1,2-butanediol, 1,3-butanediol, 1,4-butanediol, 1,4-pentanediol, 3-methyl-1,5-pentanediol, 2,3-dimethyl-2,3-butanediol, trimethylol propane, mannitol, sorbitol, glycerol, pentaerythritol, 1,4-cyclohexanedimethanol, xylenol, bisphenols such as bisphenol A or the like. In addition, ether alcohols such as diethylene glycol, triethylene glycol, tetraethylene glycol, polyoxyethylene or polyoxypropylene glycols of molecular weight up to about 4000, diethylene glycol monomethylether, diethylene glycol monoethylether, triethylene glycol monomethylether, butoxyethanol, butylene glycol monobutylether, dipentaerythritol, tripentaerythritol, tetrapentaerythritol, diglycerol, triglycerol, tetraglycerol, pentaglycerol, hexaglycerol, heptaglycerol, octaglycerol.

According to an embodiment, biocides may be selected from benzothiazoles, 1,2-benzisothiazolin-3-one, sodium dichloro-s-triazinetrione, sodium benzoate, potassium sorbate, 1,2-phenyl-isothiazolin-3-one, inter chloroxylenol paraoxybenzoate butyl.

According to an embodiment, antifoam agent may be selected from Polydimethoxysiloxane, polydimethylsiloxane, Alkyl poly acrylates, Castor Oil, Fatty Acids, Fatty Acids Esters, Fatty Acids Sulfate, Fatty Alcohol, Fatty Alcohol Esters, Fatty Alcohol Sulfate, Foot Olive Oil, Mono & Di Glyceride, Paraffin Oil, Paraffin Wax, Poly Propylene Glycol, Silicones Oil, Vegetable Fats, Vegetable Fats Sulfate, Vegetable Oil, Vegetable Oil Sulfate, Vegetable Wax, Vegetable Wax Sulfate, agents based on silicon or magnesium stearate.

The agrochemical formulation may also comprise one or more antioxidants.

Preferably, the agrochemical formulation comprises an antioxidant. Antioxidants are, for example, amino acids (e.g. glycine, histidine, tyrosine, tryptophan) and derivatives thereof, imidazole and imidazole derivatives (e.g. urocanic acid), peptides, such as, for example, D,L-carnosine, D-carnosine, L-carnosine and derivatives thereof (e.g. anserine), carotenoids, carotenes (e.g. α-carotene, β-carotene, lycopene) and derivatives thereof, lipoic acid and derivatives thereof (e.g. dihydrolipoic acid), aurothioglucose, propylthiouracil and further thio compounds (e.g. thioglycerol, thiosorbitol, thioglycolic acid, thioredoxin, glutathione, cysteine, cystine, cystamine and the glycosyl, N-acetyl, methyl, ethyl, propyl, amyl, butyl, lauryl, palmitoyl, oleyl, γ-linoleyl, cholesteryl and glyceryl esters thereof), and salts thereof, dilauryl thiodipropionate, distearyl thiodipropionate, thiodipropionic acid and derivatives thereof (esters, ethers, peptides, lipids, nucleotides, nucleosides and salts), and sulfoximine compounds (e.g. buthionine sulfoximines, homocysteine sulfoximine, buthionine sulfones, penta-, hexa-, heptathionine sulfoximine) in very low tolerated doses (e.g. pmol/kg to pmol/kg), also metal chelating agents (e.g. α-hydroxy fatty acids, EDTA, EGTA, phytic acid, lactoferrin), α-hydroxy acids (e.g. citric acid, lactic acid, malic acid), humic acids, bile acid, bile extracts, gallic esters (e.g. propyl, octyl and dodecyl gallate), flavonoids, catechins, bilirubin, biliverdin and derivatives thereof, unsaturated fatty acids and derivatives thereof (e.g. γ-linolenic acid, linoleic acid, arachidonic acid, oleic acid), folic acid and derivatives thereof, hydroquinone and derivatives thereof (e.g. arbutin), ubiquinone and ubiquinol, and derivatives thereof, vitamin C and derivatives thereof (e.g. ascorbyl palmitate, stearate, dipalmitate, acetate, Mg ascorbyl phosphates, sodium and magnesium ascorbate, disodium ascorbyl phosphate and sulfate, potassium ascorbyl tocopheryl phosphate, chitosan ascorbate), isoascorbic acid and derivatives thereof, tocopherols and derivatives thereof (e.g. tocopheryl acetate, linoleate, oleate and succinate, tocophereth-5, tocophereth-10, tocophereth-12, tocophereth-18, tocophereth-50, tocophersolan), vitamin A and derivatives (e.g. vitamin A palmitate), the coniferyl benzoate of benzoin resin, rutin, rutinic acid and derivatives thereof, disodium rutinyl disulfate, cinnamic acid and derivatives thereof (e.g. ferulic acid, ethyl ferulate, caffeeic acid), kojic acid, chitosan glycolate and salicylate, butylhydroxytoluene, butylhydroxyanisol, nordihydroguaiacic acid, nordihydroguaiaretic acid, trihydroxybutyrophenone, uric acid and derivatives thereof, mannose and derivatives thereof, selenium and selenium derivatives (e.g. selenomethionine), stilbenes and stilbene derivatives (e.g. stilbene oxide, trans-stilbene oxide). According to the invention, suitable derivatives (salts, esters, sugars, nucleotides, nucleosides, peptides and lipids) and mixtures of these specified active ingredients or plant extracts (e.g., teatree oil, rosemary extract and rosemarinic acid) which comprise these antioxidants can be used. In general, mixtures of the aforementioned antioxidants are possible.

According to an embodiment, examples of suitable solvents are water, aromatic solvents (for example, xylene), paraffins (for example mineral oil fractions such as kerosene or diesel oil), coal tar oils and oils of vegetable or animal origin, aliphatic, cyclic and aromatic hydrocarbons, for example toluene, xylene, paraffin, tetrahydronaphthalene, alkylated naphthalenes or their derivatives, alcohols (for example methanol, butanol, pentanol, benzyl alcohol, cyclohexanol), ketones (for example cyclohexanone, gamma-butyrolactone), pyrrolidones (NMP, NEP, NOP), acetates (glycol diacetate), glycols, fatty acid dimethylamides, fatty acids and fatty acid esters, isophorone and dimethylsulfoxide. In principle, solvent mixtures may also be used.

Suitable preservatives are for example 1,2-benzisothiazolin-3-one and/or 2-Methyl-2H-isothiazol-3-one or sodium benzoate or benzoic acid.

According to an embodiment of the present disclosure, the composition comprises from about 1% w/w to about 90% w/w triazolone herbicide or a derivative thereof of the total weight of the composition, from about 0.1% w/w to about 25% w/w interface additive and from about 1% w/w to about 70% w/w high surface hydrophilicity inert of the total weight of the composition.

According to an embodiment of the present disclosure, the composition comprises from about 10% w/w to about 85% w/w triazolone herbicide or a derivative thereof of the total weight of the composition, from about 1% w/w to about 20% w/w interface additive and from about 5% w/w to about 60% w/w high surface hydrophilicity inert of the total weight of the composition.

According to an embodiment of the present disclosure, the composition comprises from about 20% w/w to about 80% w/w triazolone herbicide or a derivative thereof of the total weight of the composition, from about 5% w/w to about 15% w/w interface additive and from about 10% w/w to about 50% w/w high surface hydrophilicity inert of the total weight of the composition.

According to an embodiment of the present disclosure, the composition comprises from about 1% w/w to about 90% w/w triazolone herbicide or a derivative thereof of the total weight of the composition, from about 0.1% w/w to about 25% w/w interface additive and from about 1% w/w to about 70% w/w high surface hydrophilicity inert of the total weight of the composition wherein the composition is in the form of water dispersible granules.

According to an embodiment of the present disclosure, the composition comprises from about 1% w/w to about 90% w/w amicarbazone or a derivative thereof of the total weight of the composition, from about 0.1% w/w to about 25% w/w sodium lauryl sulfate and from about 1% w/w to about 70% w/w kaolin of the total weight of the composition.

According to an embodiment of the present disclosure, the composition comprises from about 1% w/w to about 90% w/w amicarbazone or a derivative thereof of the total weight of the composition, from about 0.1% w/w to about 25% w/w sodium lauryl sulfate and from about 1% w/w to about 70% w/w ammonium sulfate of the total weight of the composition.

According to an embodiment of the present disclosure, the composition comprises from about 1% w/w to about 90% w/w amicarbazone or a derivative thereof of the total weight of the composition, from about 0.1% w/w to about 25% w/w sodium polycarboxylate and from about 1% w/w to about 70% w/w ammonium sulfate of the total weight of the composition.

According to an embodiment of the present disclosure, the composition comprises from about 1% w/w to about 90% w/w amicarbazone or a derivative thereof of the total weight of the composition, from about 1% w/w to about 50% w/w flumioxazin or a derivative thereof of the total weight of the composition, from about 0.1% w/w to about 25% w/w sodium lauryl sulfate and from about 1% w/w to about 70% w/w kaolin of the total weight of the composition.

According to an embodiment of the present disclosure, the composition comprises from about 1% w/w to about 90% w/w amicarbazone or a derivative thereof of the total weight of the composition, from about 1% w/w to about 50% w/w flumioxazin or a derivative thereof of the total weight of the composition, from about 0.1% w/w to about 25% w/w sodium lauryl sulfate, sodium polycarboxylate and sodium dodecylbenzenesulfonate and from about 1% w/w to about 70% w/w kaolin of the total weight of the composition.

According to an embodiment of the present disclosure, the composition comprises from about 1% w/w to about 90% w/w amicarbazone or a derivative thereof of the total weight of the composition, from about 1% w/w to about 50% w/w isoxaflutole or a derivative thereof of the total weight of the composition, from about 0.1% w/w to about 25% w/w sodium polycarboxylate and from about 1% w/w to about 70% w/w ammonium sulfate of the total weight of the composition.

According to an embodiment of the present disclosure, the composition comprises from about 1% w/w to about 90% w/w amicarbazone or a derivative thereof of the total weight of the composition, from about 1% w/w to about 50% w/w metribuzin or a derivative thereof of the total weight of the composition, from about 0.1% w/w to about 25% w/w sodium dodecylbenzenesulphonate and from about 1% w/w to about 70% w/w ammonium sulfate of the total weight of the composition.

According to an embodiment of the present disclosure, a process of preparing an agrochemical composition comprises:

(i) mixing triazolone herbicide or a derivative thereof and dispersion aid to obtain a homogeneous mixture;

(ii) obtaining granules from the homogeneous mixture;

(iii) drying the granules to obtain an agrochemical composition

According to an embodiment, dispersion aid comprises at least one interface additive and a high surface hydrophilicity inert.

According to an embodiment, the granules in step (ii) are obtained by granulation, spray drying or extrusion method.

According to an embodiment of the present disclosure, the process of preparing an agrochemical composition comprises:

(i) mixing, blending, and milling a triazolone herbicide or a derivative thereof and dispersion aid to obtain a homogeneous mixture;

(ii) obtaining granules from the homogeneous mixture;
(iii) drying the granules to obtain an agrochemical composition.

According to an embodiment, the dispersion aid comprises at least one interface additive and a high surface hydrophilicity inert.

According to an embodiment of the present disclosure, the process of preparing an agrochemical composition comprises:

(i) mixing, blending, and milling a triazolone herbicide or a derivative thereof and a dispersion aid to obtain a homogeneous mixture;
(ii) preparing a dough by mixing water with the homogeneous mixture;
(iii) extruding the dough to obtain granules;
(iv) drying the granules to obtain the composition.

According to an embodiment, the dispersion aid comprises at least one interface additive and a high surface hydrophilicity inert.

According to an embodiment of the present disclosure, the process of preparing an agrochemical composition comprises:

(i) mixing, blending, and milling a triazolone herbicide or a derivative thereof, at least one additional active ingredient or derivatives thereof and dispersion aid to obtain a homogeneous mixture;
(ii) preparing a dough by mixing water with the homogeneous;
(iii) extruding the dough to obtain granules;
(iv) drying the granules to obtain the composition, According to an embodiment, the dispersion aid comprises at least one interface additive and a high surface hydrophilicity inert.

According to an embodiment of the present disclosure, the process of preparing agrochemical composition comprising: (a) at least one triazolone herbicide or a derivative thereof, and (b) dispersion aid comprising at least one interface additive and a high surface hydrophilicity inert; in the form of WDG comprises pan granulation, spray drying or extrusion.

According to an embodiment of the present disclosure, the process of preparing agrochemical composition comprising: (a) at least one triazolone herbicide or a derivative thereof, and (b) dispersion aid comprising at least one interface additive and a high surface hydrophilicity inert; in the form of WDG by way of extrusion.

According to an embodiment of the present disclosure, the process of preparing an agrochemical composition comprises:

(i) mixing, blending, and milling amicarbazone or a derivative thereof and dispersion aid comprising of alkylsulfonic acid and ammonium sulfate to obtain a homogeneous mixture;
(ii) preparing a dough by mixing water with the homogeneous mixture;
(iii) extruding the dough to obtain granules;
(iv) drying the granules to obtain the composition, wherein the composition comprises amicarbazone or a derivative thereof, alkylsulfonic acid and ammonium sulfate.

According to an embodiment of the present disclosure, the process of preparing an agrochemical composition comprises:

(i) mixing, blending, and milling amicarbazone or a derivative thereof, flumioxazin or a derivative thereof, arylsulfonic acid, kaolin, and optionally other excipients to obtain a homogeneous mixture;

(ii) preparing dough by mixing water with the homogeneous mixture;
(iii) extruding the dough to obtain granules;
(iv) drying the granules to obtain the composition, wherein the composition comprises amicarbazone or a derivative thereof, flumioxazin or a derivative thereof, arylsulfonic acid, kaolin, and optionally other excipients.

According to an embodiment of the present disclosure, the process of preparing an agrochemical composition comprising:

(i) mixing, blending, and milling amicarbazone or a derivative thereof, metribuzin or a derivative thereof, arylsulfonic acid, ammonium sulfate and optionally other excipients to obtain homogeneous mixture;
(ii) preparing dough by mixing water with the homogeneous mixture;
(iii) extruding the dough to obtain granules;
(iv) drying the granules to obtain the composition, wherein the composition comprises amicarbazone or a derivative thereof, metribuzin or a derivative thereof, arylsulfonic acid, and ammonium sulfate.

According to an embodiment of the present disclosure, the process of preparing an agrochemical composition comprises:

(i) mixing, blending, and milling amicarbazone or a derivative thereof, isoxaflutole or a derivative thereof, arylsulfonic acid, ammonium sulfate and optionally other excipients to obtain a homogeneous mixture;
(ii) preparing a dough by mixing water with the homogeneous mixture;
(iii) extruding the dough to obtain granules; and
(iv) drying the granules to obtain the composition, wherein the composition comprises amicarbazone or a derivative thereof, isoxaflutole or a derivative thereof, arylsulfonic acid, and ammonium sulfate.

The order of addition and mixing of the agrochemical ingredients and/or excipients is not narrowly critical. In one embodiment, for example, the dry ingredients are blended, and the composition is then mixed with water to obtain dough.

According to an embodiment of the present disclosure, water may be added as a fine spray to prepare dough.

According to an embodiment of the present disclosure, the blend is obtained using a suitable blender such as ribbon blender, V-blender, high intensity low mixer, plough shear mixer, and kneader mixer.

According to an embodiment of the present disclosure, blend of triazolone herbicide or a derivative thereof, dispersion aid and agrochemical excipients may be taken for milling.

The grinding may be performed in a suitable device such as air jet mill, air classifier mill, hammer mill, and pin disc mill. Jet mills are shear or pulverizing machines in which the particles to be milled are accelerated by gas flows and pulverized by collision. There are several different types of jet mill designs, such as double counterflow (opposing jet) and spiral (pancake) fluid energy mills.

According to an embodiment of the present disclosure, water dispersible granules are normally made through an extrusion process.

According to an embodiment of the present disclosure, drying of granules may be performed in a suitable drying equipment such as spray drier or fluidized bed spray drier or fluid bed spray granulator.

According to an embodiment of the present disclosure, the drying of extruded granules is done at a temperature not more than 40 to 80 0C.

According to preferred embodiment of the present disclosure, the drying of granules is done at a temperature range of 40 to 65 0C.

The drying process will preferably remove as much water as possible in order to reduce weight and to provide good stability to the granules while still in a dry flowable state. Preferably the granules will less than 2% weight loss on drying and most preferably less than 1% weight loss on complete drying.

According to an embodiment of the present disclosure, ingredients used in the process of preparing the composition may be in a finely divided form, preferably in an air-milled form.

After thorough mixing or after otherwise putting the mix into a form suitable for extrusion, extrusion takes place through suitable orifices. The size of the granules will depend upon the size of the orifices and the extruder may thus be fitted with a mesh or die selected to provide a desired size of granule.

Preferably extrusion orifices are chosen to provide extrusions between 800 and 1200 microns in diameter. The extrusions can vary considerably in length, for example up to 0.5 cm or more long.

In an embodiment of the present disclosure, pH of the agrochemical composition is adjusted between 4 to 7.

The process of the disclosure considerably reduces the amount of oversized and undersized material which must be recycled. Consequently, the granule composition is essentially dust free.

According to an embodiment of the present disclosure, there is provided a method of controlling weeds by applying to the plants or to their locus, an agrochemical composition comprising: (a) at least one triazolone herbicide, and (b) dispersion aid comprising at least one interface additive and a high surface hydrophilicity inert.

According to an embodiment of the present disclosure, there is provided a method of controlling weeds by applying to the plants or to their locus, an agrochemical composition comprising: (a) amicarbazone, and (b) dispersion aid comprising at least one interface additive and a high surface hydrophilicity inert.

According to an embodiment of the present disclosure, there is provided a method of controlling weeds by applying to the plants or to their locus, an agrochemical composition comprising: (a) at least one triazolone herbicide or a derivative thereof; (b) at least one additional active ingredient selected from of isoxazole, N-phenylimide and triazinone group of herbicides; and (c) a dispersion aid comprising at least one interface additive and a high surface hydrophilicity inert.

According to an embodiment of the present disclosure, there is provided a method of controlling weeds by applying to the plants or to their locus, an agrochemical composition comprising: (a) amicarbazone, (b) isoxaflutole, and (c) dispersion aid comprising at least one interface additive and a high surface hydrophilicity inert.

According to an embodiment of the present disclosure, there is provided a method of controlling weeds by applying to the plants or to their locus, an agrochemical composition comprising: (a) amicarbazone, (b) flumioxazin, and (c) dispersion aid comprising at least one interface additive and a high surface hydrophilicity inert.

According to an embodiment of the present disclosure, a method of controlling weeds by applying to the plants or to their locus, an agrochemical composition comprising: (a) amicarbazone, (b) metribuzin, and (c) dispersion aid comprising at least one interface additive and a high surface hydrophilicity inert.

An embodiment of the present invention discloses use of an agrochemical composition for controlling weeds wherein the composition comprises of at least one triazolone herbicide or a derivative thereof; a dispersion aid comprising at least one interface additive and a high surface hydrophilicity inert, and optionally at least one additional active ingredient.

The agrochemical composition of the present disclosure may be used to target weeds among the crops such as corn, rice, wheat, barley, rye, oat, sorghum, cotton, soybean, peanut, buckwheat, beet, rapeseed, sunflower, sugar cane, and tobacco; solanaceous vegetables such as eggplant, tomato, pimento, popper, and potato, cucurbit vegetables such as cucumber, pumpkin, zucchini, water melon, melon, and squash, cruciferous vegetables such as radish, white turnip, horseradish, kohlrabi, Chinese cabbage, cabbage, leaf mustard, broccoli, and cauliflower, asteraceous vegetables such as burdock, crown daisy, artichoke, and lettuce, liliaceous vegetables such as green onion, onion, garlic, and asparagus, ammiaceous vegetables such as carrot, parsley, celery, and parsnip, chenopodiaccous vegetables such as spinach, and Swiss chard, lamiaceous vegetables such as *Perilla frutescens*, mint, and basil, strawberry, sweet potato, *Dioscorea japonica*, colocasia, flowers, foliage plants, turf grasses, fruits such as pome fruits such as apple, pear, quince, stone fleshy fruits such as peach, plum, nectarine, *Prunus* mume, cherry fruit, apricot, prune, citrus fruits such as orange, lemon, rime, grapefruit, nuts such as chestnuts, walnuts, hazelnuts, almond, pistachio, cashew nuts, macadamia nuts, berries such as blueberry, cranberry, blackberry, raspberry, grape, kaki fruit, olive, plum, banana, coffee, date palm, coconuts, trees otter than fruit trees; tea, mulberry, flowering plant, trees such as ash, birch, dogwood, Eucalyptus, Ginkgo biloba, lilac, maple, Quercus, poplar, Judas tree, liquidambar formosana, plane tree, zelkova Japanese arborvitae, fir wood, hemlock, juniper, Pinus, Picca, and Taxus cuspidate.

According to an embodiment of the present disclosure, target weeds include *Alopecurus myosuroides* (blackgrass, ALOMY), *Amaranthus palmeri* (Palmer amaranth, AMAPA), *Amaranthus viridis* (slender amaranth, AMAVI), *Avena fatua* (wild oat, AVEFA), *Brachiaria decumbens, Urochloa decumbens* (Stapf), *Brachiaria brizantha, Urochloa brizantha, Brachiaria platyphylla* (Groseb.) Nash, *Urochloa platyphylla* (broadleaf signalgrass, BRAPP), *Brachiaria plantaginea, Urochloa plantaginea* (alexandergrass, BRAPL), *Cenchrus echinatus* (southern sandbar, CENEC), *Digitaria horizontalis* Willd. (Jamaican crabgrass, DIGHO), *Digitaria insularis* (sourgrass, TRCIN), *Digitaria sanguinalis* (large crabgrass, DIGSA), *Echinochloa crus-galli* (barnyardgrass, ECHCG), *Echinochloa colonum* (junglerice, ECHCO), *Elcusine indica* Gaertn. (goosegrass, ELEIN), *Lolium multiflorum* Lam. (Italian ryegrass, LOLMU), *Panicum dichlotomiflorum* Michx. (fall panicum, PANDI), *Panicurn miliaceum* L. (wild-proso millet, PANMI), *Sesbania exaltata* (hemp *sesbania*, SEBEX), *Setaria faberi* Herrm. (giant foxtail, SETFA), *Setaria viridis* (green foxtail, SETVI), *Sorghum halepense* (Johnsongrass, SORHA), *Sorghum bicolor, Moench* ssp., *Arundinaceum* (shattercane, SORVU), *Cyperus esculentus* (yellow nutsedge, CYPES), *Cyperus rotundus* (purple nutsedge, CYPRO), *Abutilon theophrasti* (velvetleaf, ABUTH), *Amaranthus* species (pigweeds and amaranths, AMASS), *Ambrosia artemislifolia* L. (common ragweed, AMBEL),

*Ambrosia psilostachya* DC. (western ragweed, AMBPS), *Ambrosia trifida* (giant ragweed, AMBTR), *Arioda aristata* (spurred anoda, ANVCR), *Asclepias syriaca* (common milkweed, ASCSY), *Bidens pilosa* (hairy beggarticks, BIDPI), *Borreria* species (BOISS), *Borreria alata Spermacoce alata* Aubl., *Spermacoce latifolia* (broadleaf buttonweed, BOILF), *Chenopodium album* L. (common lambsquarters, CHEAL), *Cirsium arvense* (Canada thistle, CIRAR), *Commelina benghalensis* (tropical spiderwort, COMBE), *Datura stramonium* (jimsonweed, DATST), *Daucus carota* (wild carrot, DAUCA), *Euphorbia heterophylla* (wild poinsettia, EPHHL), *Euphorbia hirta, Chamacsyce hirta* (garden spurge, EPHHI), *Euphorbia dentata* Michx. (toothed spurge, EPHDE), *Erigeron bonariensis, Conyza bonariensis* (hairy fleabane, ERIBO), *Erigeron canadensis, Conyza canaderisis* (horseweed, ERICA), *Conyza sumatrensis* (tall fleabane, ERIFL), *Helianthus annuus* (common sunflower, HELAN), *Jacquemontia tamnifolia* (smallflower morningglory, IAQTA), *Ipomoca hederacea* (ivyleaf morningglory, IPOHE), *Ipomoca lacunosa* (white morningglory, IPOLA), *Lactuca serriola* (prickly lettuce, LACSE), *Portulaca oleracoa* (common purslane, POROL), *Richardia* species (pusley, RCHSS), *Salsola tragus* (Russian thistle, SASKR), *Sida* species (*sida*, SIDSS), *Sida spinosa* (prickly sida, SIDSP), *Sinapis arvensis* (wild mustard, SINAR), *Solanum ptychanthum* (eastern black nightshade, SOLPT), *Tridax procumbens* (coat buttons, TRQPR), *Xanthium strumarium* (common cocklebur, XANST).

According to an embodiment, the composition according to the present disclosure may be applied either pre or post emergent. The advantage of the composition is surprisingly good residual effects, when applied in pre-emergent as well as quick knockdown when applied post emergent leading to quick control of weeds.

In another embodiment, the composition according to the present disclosure may be applied for quick burndown of weeds.

According to an embodiment of the present disclosure, the agrochemical composition is used as herbicide.

According to an embodiment of the present disclosure, the agrochemical composition comprising amicarbazone or a derivative thereof and dispersion aid; is used as herbicide.

According to an embodiment of the present disclosure, the agrochemical composition comprising amicarbazone or a derivative thereof, at least one additional herbicide or derivatives thereof and dispersion aid is used as herbicide.

In an embodiment, the present invention provides a composition comprising at least one triazolone herbicide or a derivative thereof for controlling weeds selected from the group of *Alternaria tenella, Brachiaria decumbens, Cyperus rotundus, Digitaria nuda, Eleusine indica, Ipomoea hederifolia, Merremia cissoides.*

In an embodiment, the present composition is applied at pre-emergence or post-emergence stage of the weed.

In an embodiment, the present composition is applied at a spray volume in the range from 100 to 200 L/ha.

According to an embodiment of the present disclosure, a kit-of-parts comprising an agrochemical composition is provided. The kit comprises a plurality of components, each of which components may include at least one of the ingredients of the agrochemical composition of the present disclosure.

An embodiment of the present invention discloses a kit-of-parts comprising an agrochemical composition of at least one triazolone herbicide or a derivative thereof, a dispersion aid comprising at least one interface additive and a high surface hydrophilicity inert, and optionally at least one additional active ingredient.

In one embodiment of the present disclosure, the kits may include one or more, including all, components that may be used to prepare the agrochemical composition. E. g., kits may include triazolone herbicide, another herbicide and a dispersion aid comprising interface additive and high surface hydrophilicity inert. One or more of the components may already be combined or pre-formulated. In those embodiments where more than two components are provided in a kit, the components may already be combined and as such are packaged in a single container such as a vial, bottle, can, pouch, bag, or canister.

It will be understood that the specification and examples are illustrative but not limitative of the present disclosure and that other embodiments within the spirit and scope of the disclosure will suggest themselves to those skilled in the art. Other embodiments can be practiced that are also within the scope of the present disclosure. The following examples illustrate the disclosure, but by no means intend to limit the scope of the claims.

Example 1: Amicarbazone 700 WG

| Ingredients | Amount % w/w |
| --- | --- |
| Amicarbazone Technical | 71.79 |
| Sodium lignosulfonate | 8 |
| Alkyl Naphthalene Sulfonate | 10 |
| Ammonium sulfate | q.s |
| Total | 100 |

Amicarbazone, sodium lignosulfonate, alkyl naphthalene sulfonate, and ammonium sulfate were added in above mentioned quantity and blended in a ribbon blender for 20-30 min to obtain blend. The blend was further grounded in air jet mill to obtain grounded mix. The grounded mix was then blended for 40-50 min to obtain homogeneous mixture. The homogeneous mixture was taken to prepare dough using water spray. Granules were then extruded in a granulator having sieve size 0.8 to 1.2 mm aperture. The extruded granules were dried on a fluid bed dryer at a temperature ranging between 50° C. to 55° C. The dried granules were passed through sieve to obtain uniformly sized granules. Undersized and oversized granules were recycled back. Finished granules were packed in a suitable packaging.

Example 2: Amicarbazone 700 WG

| Ingredients | Amount (% w/w) |
| --- | --- |
| Amicarbazone | 71.79 |
| Binder (vinyl pyrrolidone/vinyl acetate copolymer) | 2 |
| Sodium lignosulfonate | 8 |
| Alkyl Naphthalene Sulfonate Formaldehyde Condensate | 10 |
| Kaolin | q.s |
| Total | 100 |

Amicarbazone, vinyl pyrrolidone/vinyl acetate copolymers, sodium lignosulfonate, alkyl naphthalene sulfonate formaldehyde condensate and kaolin were mixed in above mentioned quantity and WDG were obtained as per the process of Example 1.

Example 3: Amicarbazone 700+Flumioxazin 125 WG

| Ingredients | Amount (% w/w) |
|---|---|
| Amicarbazone | 71.79 |
| Flumioxazin | 12.51 |
| Sodium Polycarboxylate | 7.0 |
| Sodium Lauryl Sulfate | 4.0 |
| Kaolin | q.s |
| Total | 100 |

Amicarbazone, flumioxazin, Sodium Polycarboxylate, sodium lauryl sulfate, and kaolin were mixed in above mentioned quantity and WDG were obtained as per the process of Example 1.

Example 4: Amicarbazone 700+Flumioxazin 125 WG

| Ingredients | Amount (% w/w) |
|---|---|
| Amicarbazone | 71.79 |
| Flumioxazin | 12.51 |
| Sodium polycarboxylate | 7.00 |
| Sodium lauryl sulfate | 3.00 |
| Kaolin | q.s |

Amicarbazone, flumioxazin, Sodium polycarboxylate, sodium lauryl sulfate and kaolin were mixed in above mentioned quantity and WDG were obtained as per the process of Example 1.

Example 5: Amicarbazone 700+Isoxaflutole 75 WG

| Ingredients | Amount (% w/w) |
|---|---|
| Amicarbazone | 71.93 |
| Isoxaflutole | 7.96 |
| methylene-linked condensation product of arylsulphonic acid | 8 |
| Sodium butyl & dibutyl naphthalene sulfonate | 2 |
| Sodium Diisopropyl naphthalene sulfonate | 0.5 |
| Ammonium sulfate | q.s |
| Total | 100 |

Amicarbazone, isoxaflutole, methylene-linked condensation product of arylsulphonic acid, sodium butyl & dibutyl naphthalene sulfonate, sodium diisopropyl naphthalene sulfonate, and ammonium sulfate were mixed in above mentioned quantity and WDG were obtained as per the process of Example 1.

Example 6: Amicarbazone 432+Metribuzin 280 WG

| Ingredients | Amount (% w/w) |
|---|---|
| Amicarbazone Technical | 43.5 |
| Metribuzin Technical | 28.5 |
| Sodium Lauryl Sulfate | 5 |
| sodium lignosulfonate | 16.5 |
| Ammonium Sulfate | q.s |
| Total | 100 |

Amicarbazone, metribuzin, sodium lauryl sulfate, sodium lignosulfonate, and ammonium sulfate were mixed in above mentioned quantity and WDG were obtained as per the process of Example 1.

Example 7: Amicarbazone 432+Metribuzin 280 WG

| Ingredients | Amount % w/w |
|---|---|
| Amicarbazone | 43.5 |
| Metribuzin Technical | 28.5 |
| Sodium Lauryl Sulfate | 5 |
| Sodium lignosulfonate | 10 |
| Ammonium Sulfate | q.s |
| Total | 100 |

Amicarbazone, metribuzin, sodium lauryl sulfate, sodium lignosulfonate and ammonium sulfate were mixed in above mentioned quantity and WDG were obtained as per the process of Example 1.

Stability Study of Agrochemical Composition

The agrochemical compositions of Example 1-7 were prepared according to the present disclosure utilizing a dispersion aid that comprises salts of alkyl or aryl sulphonic acid and a high surface hydrophilicity inert. It was found that the compositions of Examples 1-7 were stable passing all the parameters of stability testing. Inversions of Example 1-7 remained under acceptable range from 10-18. Negligible degradation was observed for actives such as amicarbazone, isoxaflutole and flumioxazin. Suspensibility of the compositions found to be above 95% in all the compositions. pH remained within acceptable range within 4.5-6. Controlled foaming was observed in all the compositions of Example 1-7. (Table 1 and Table 2).

TABLE 1

| | Example 1 | | Example 2 | | Example 3 | | Example 4 | |
|---|---|---|---|---|---|---|---|---|
| Parameters | Ambient 25° C. | 14D 54° C. | Ambient 25° C. | 14D 54° C. | Ambient 25° C. | 14D 54° C. | Ambient 25° C. | 14D 54° C. |
| No of Inversions | 15 | 18 | 10 | 16 | 13 | 14 | 14 | 18 |
| Wet Sieve, % w/w pass through 200 mesh | 100 | 100 | 100 | 100 | 99.2 | 99.85 | 99.6 | 99.56 |
| Susp. @20 ppm, % w/w | 95.51 | 96.12 | — | — | 98.60 | 98.30 | 97.79 | 97.56 |

TABLE 1-continued

| Parameters | Example 1 Ambient 25° C. | Example 1 14D 54° C. | Example 2 Ambient 25° C. | Example 2 14D 54° C. | Example 3 Ambient 25° C. | Example 3 14D 54° C. | Example 4 Ambient 25° C. | Example 4 14D 54° C. |
|---|---|---|---|---|---|---|---|---|
| Susp. @342 ppm, % w/w | 95.11 | 95.03 | 95.0 | 87.6 | 95.84 | 96.47 | 95.70 | 96.66 |
| pH, 1% aq. Solution | 4.8 | 4.79 | 4.70 | 4.55 | 5.5 | 5.57 | 5.54 | 5.62 |
| persistent foam @20, cm | 2 | 2.1 | 2 | 2 | 0 | 0 | 1 | 3 |
| Amicarbazone content, % w/w | 71.24 | 71.13 | 71.30 | 70.17 | 70.25 | 70.10 | 70.25 | 70.10 |
| Flumioxazin Content (g % w/w | — | — | — | — | 12.89 | 12.79 | 12.89 | 12.79 |
| Remarks | Desired & Stable | | Desired & Stable | | Desired & Stable | | Desired & Stable | |

TABLE 2

| Parameters | Example 5 Ambient 25° C. | Example 5 14 Days 54° C. | Example 6 Ambient 25° C. | Example 6 14 Days 54° C. | Example 7 Ambient 25° C. | Example 7 14 Days 54° C. |
|---|---|---|---|---|---|---|
| No of Inversions | 5 | 6 | 12 | 11 | 10 | 10 |
| Wet Sieve, % w/w pass through 200 mesh | 100 | 100 | 100 | 100 | 100 | 100 |
| Susp. @20 ppm, % w/w | 96.86 | 96.79 | 98.86 | 98.86 | — | — |
| Susp. @342 ppm, % w/w | 94.58 | 94.5 | 89.82 | 87.87 | 98.0 | 96.02 |
| pH, 1% aq. Solution | 5.69 | 6.38 | 5.12 | 5.02 | 4.5 | 4.9 |
| persistent foam @20, cm | 1.5 | 1.8 | 3 | 3 | 3 | 3 |
| Amicarbazone content % w/w | 72.19 | 71.84 | 42.81 | 42.75 | 44.08 | 44.06 |
| Isoxaflutole content % w/w | 7.77 | 7.74 | — | — | — | — |
| Metribuzin content % w/w | — | — | 29.83 | 29.05 | 29.00 | 28.06 |
| Remarks | Desired & Stable | | Desired & Stable | | Desired & Stable | |

Example 8: Amicarbazone 700+Flumioxazin 125 WG (Comparative Example

| Ingredients | Amount (% w/w) |
|---|---|
| Amicarbazone (97.5%) | 71.79 |
| Flumioxazin (99.9%) | 12.51 |
| Ethoxylated polyarylphenol | 8.00 |
| Lactose | q.s |
| Total | 100 |

Amicarbazone, flumioxazin, ethoxylated polyarylphenol and lactose were mixed in above mentioned quantity and WDG were obtained as per the process of Example 1.

Physico-Chemical Study of Example 8

Composition of Example 8 was developed using Ethoxylated polyarylphenol and lactose. It failed due to higher number of inversions as well as poor wet sieve retention. Therefore, it could not consider for further physico-chemical study as well as AHS. (Table 3)

TABLE 3

| Parameters | Ambient@25° C. |
|---|---|
| No. of Inversions | 30+ |
| Wet Sieve, % w/w pass through 200 mesh | 91.74 |

TABLE 3-continued

| Parameters | Ambient@25° C. |
|---|---|
| Remark | Failed in no. of inversion, not analysed further. |

Example 9: Amicarbazone 700+Flumioxazin 125 WG (Comparative Example

| Ingredients | Amount (% w/w) |
|---|---|
| Amicarbazone (97.5%) | 71.79 |
| Flumioxazin (99.9%) | 12.51 |
| Sodium polycarboxylate | 8.00 |
| Lactose | q.s |
| Total | 100 |

Amicarbazone, flumioxazin, sodium polycarboxylate and lactose were mixed in above mentioned quantity and WDG were obtained as per the process of Example 1.

Physico-Chemical Study of Example 9

Composition of Example 9 was developed using sodium polycarboxylate and lactose. The WDG processing yielded thread like granules which were not acceptable as finished composition being too fragile and failed to pass quality check. The high pH as well as greater amount of persistent foam was noticed. Moreover, amicarbazone degradation was recorded. (Table 4)

TABLE 4

| Parameters | Initial | 14D 54° C. |
|---|---|---|
| No of Inversions | 16 | 18 |
| Wet Sieve, % w/w pass through 200 mesh | 100 | 100 |
| Susp. @20 ppm, % w/w | 98.66 | 93.45 |
| Susp. @342 ppm, % w/w | 93.01 | 93.84 |
| pH, 1% aq. Solution | 10.77 | 11.08 |
| persistent foam @20, cm | 3.5 | 4 |
| Amicarbazone Content, (% w/w) | 69.06 | 67.10 |
| Flumioxazin Content, (% w/w) | 13.09 | 13.17 |

Example 10: Amicarbazone 700+Flumioxazin 125 WG (Comparative Example

| Ingredients | Amount (% w/w) |
|---|---|
| Amicarbazone (97.5%) | 71.79 |
| Flumioxazin (99.9%) | 12.51 |
| Sodium polycarboxylate | 8.00 |
| Sodium lauryl sulfate | 3.00 |
| Sodium lignosulphonate | 7.00 |
| Lactose | 3.7 |

Amicarbazone, flumioxazin, sodium polycarboxylate, sodium lauryl sulphate, sodium lignosulphonate and lactose were mixed in above mentioned quantity and WDG were obtained as per the process of Example 1.

Physico-Chemical Study of Example 10

Composition of Example 10 was developed using sodium polycarboxylate, sodium lauryl sulphate and lactose. During phys-chem study performed on 0 days at ambient condition, the composition appeared suitable on suspensibility parameter but resulted into high foam and pH. The high pH as well as greater amount of persistent foam was noticed. When the composition was kept for storage for 14 days at 54° C. and later analysed, it resulted into high inversions (30+). The granules were not able to disintegrate and hence it could not be analysed further. Moreover, amicarbazone degradation was recorded. (Table 4)

TABLE 4

| Parameters | Initial | 14D 54° C. |
|---|---|---|
| No of Inversions | 20 | 30+ |
| Wet Sieve, % w/w pass through 200 mesh | 100 | |
| Susp. @20 ppm, % w/w | 95.04 | |
| Susp. @342 ppm, % w/w | 93.46 | |
| pH, 1% aq. Solution | 10.55 | |
| persistent foam @20, cm | 4.5 | |
| Amicarbazone Content, (% w/w) | 69.71 | |
| Flumioxazin Content, (% w/w) | 13.02 | |

Real Time Physico-Chemical Study

To evaluate the physico-chemical parameters in real time, few compositions developed according to the present invention were kept in storage. Observations were made after 30 months (for composition of Example 3), 12 months (for compositions of Example 3 and 4), 16 months (for composition of Example 5) and 12 months (for composition of Example 7). All the compositions were found to be stable with respect to degradation of active ingredients. Suspensibility of the granules found was to be greater than 90% in both 30-ppm hardness water and 342 ppm hardness water. pH of the compositions was also found to be within neutral range. All the compositions were found to generate foam within acceptable limit. Therefore, it was concluded that the compositions kept under real time study were stable. (Table 5)

TABLE 5

| Parameters | Example 2 (30 Months) | Example 3 (12 months) | Example 4 (12 months) | Example 5 (16 Months) | Example 7 (12 Months) |
|---|---|---|---|---|---|
| No of Inversions | 18 | 20 | 18 | 8 | 12 |
| Wet Sieve, % w/w pass through 200 mesh | 99.92 | 99.84 | 99.87 | 99.99 | 99.99 |
| Susp. @20 ppm, % w/w | 90.5 | 93.40 | 96.30 | 96.3 | 98.12 |
| Susp. @342 ppm, % w/w | 90.1 | 92.17 | 94.80 | 95.3 | 88.11 |
| pH, 1% aq. Solution | 4.90 | 5.70 | 5.66 | 6.47 | 5.32 |
| persistent foam @20, cm | Nil | 2.8 | 3.2 | 1.8 | 3 |
| Amicarbazone content, (% w/w) | 69.56 | 70.12 | 70.10 | 70.29 | 42.82 |
| Flumioxazin Content (% w/w) | — | 12.66 | 12.70 | — | — |
| Metribuzin content (% w/w) | — | — | — | — | 26.95 |
| Isoxaflutole content % w/w | — | — | — | 7.50 | — |
| Remarks | Desired and stable | Desired and stable | Desired and stable | Desired and stable | Desired and stable |

Field Trial Efficacy Data

Composition of Example 3 was taken for field trial evaluation in sugar cane fields. Some of the common weeds prevailing in sugar cane fields are *Alternaria tenella, Brachiaria decumbens, Cyperus rotundus, Digitaria nuda, Eleusine indica, Ipomoea hederifolia, Merremia cissoides.* Single pre-emergence (both crop and weed) application was made on the sugar cane field and observations were made at different intervals with the final observation made at 120 days after application (DAA). The composition of Example 3 found very effective in controlling more than 80% weeds of sugar cane. (Table 6 & 7)

TABLE 6

TREATMENT DETAIL

| Treatments | Formu-lation | Rates (kg L/ha) | Active Ingredient (g of a.i/ha) |
|---|---|---|---|
| Example 3 | WG | 1.20 | amicarbazone (840) & flumioxazin (150) |

TABLE 7

| Weed(s) | Trial | % Control evaluated at 120DAA |
|---|---|---|
| *Alternanthera tenella* | Trial 1 | 100 |
| *Brachiaria decumbens* | Trial 1 | 95 |
| | Trial 2 | 88 |
| | Trial 3 | 100 |
| *Cyperus rotundus* | Trial 1 | 100 |
| *Digitaria nuda* | Trial 1 | 98 |
| | Trial 2 | 93 |
| *Eleusine Indica* | Trial 1 | 98 |
| | Trial 2 | 86 |
| *Ipomoea hederifolia* | Trial 1 | 100 |
| | Trial 2 | 100 |
| | Trial 3 | 95 |
| | Trial 4 | 97 |
| *Merremia cissoides* | Trial 1 | 100 |
| | Trial 2 | 99 |

The inventors of the present disclosure successfully developed various stable agrochemical compositions in the form of extruded granules of triazolone herbicide, alone or in combination with other active ingredients using a dispersion aid. The stable agrochemical compositions demonstrated excellent suspensibility and dispersibility upon dilution. The active ingredients were found to remain quite stable after preparation and even during storage studies. pH of the composition remained quite stable. The current disclosure also demonstrated advantageous methods of controlling weeds both pre and post emergently.

The invention claimed is:

1. An agrochemical composition consisting of:
a) amicarbazone; and,
b) a dispersion aid comprising at least one interface additive and a high surface hydrophilicity inert;
(c) at least one agrochemically suitable excipient selected from adjuvants, co-solvents, surfactants, colorants, emulsifiers, thickeners, antifreeze agents, biocides, anti-foam agents, stabilizers, wetting agents or a mixture thereof; and,
wherein the interface additive and the high surface hydrophilicity inert are present in ratios from about 1:5 to 5:1, and
wherein the composition is in the form of water dispersible granules;
wherein said dispersion aid comprises from about 10% w/w to about 50% w/w of the high surface hydrophilicity inert and from about 5% w/w to about 15% w/w of the interface additive of the total weight of the agrochemical composition.

2. The composition as claimed in claim 1, wherein said composition further consists of from about 20% w/w to about 80% w/w amicarbazone of the total weight of the composition.

3. The composition as claimed in claim 1, wherein said interface additive is selected from the group consisting of salts of sulphonic acid derivatives.

4. The composition as claimed in claim 3, wherein said interface additive is selected from the group consisting of salts of alkyl and aryl sulphonic acid derivatives.

5. The composition as claimed in claim 3, wherein said salts of sulfonic acid derivatives are selected from the group consisting of sodium butyl naphthalene sulfonate, sodium nonyl naphthalene sulfonate, naphthalene sulfonate-formaldehyde condensate, alkyl naphthalene sulfonate-formaldehyde condensate, sodium isopropyl naphthalene sulfonate, sodium dodecylbenzenesulphonate, sodium lauryl sulfate, calcium dioctyl naphthalene sulfonate, linear dodecylbenzene sulfonic acid, branched dodecylbenzene sulfonic acid, linear dodecylbenzene sulfonate isopropylamine salt, naphthalene sulfonate-formaldehyde condensates, alkyl substituted naphthalene sulfonate-formaldehyde condensates, sodium alkyl naphthalene sulfonate, and sodium salt of sulfonated naphthalene-formaldehyde condensate, methylene-linked condensation product of arylsulphonic acid, sodium butyl naphthalene sulfonate, sodium dibutyl naphthalene sulfonate and sodium diisopropyl naphthalene sulfonate.

6. The composition as claimed in claim 1, wherein said high surface hydrophilicity inert is selected from the group consisting of kaolin, china clay and bentonite clays, synthetic and diatomaceous silicas, calcium and magnesium silicates, titanium dioxide, aluminium, calcium or magnesium carbonate, ammonium sulfate, sodium sulfate, potassium sulfate, calcium sulfate or barium sulfate, charcoal, starch, modified starches, and mixtures thereof.

7. A process of preparing an agrochemical composition according to claim 1 consisting of:
(i) mixing amicarbazone and a dispersion aid to obtain a homogeneous mixture;
(ii) obtaining granules from the homogeneous mixture; and
(iii) drying the granules to obtain a composition according to claim 1.

8. The process as claimed in claim 7, wherein said granules in step (ii) are obtained by granulation, spray drying or extrusion method.

9. The process as claimed in claim 7, wherein the dispersion aid is a mixture of an interface additive and a high surface hydrophilicity inert.

10. The process as claimed in claim 7, wherein an additional active ingredient or derivatives thereof is further added in said homogeneous mixture.

11. A method of controlling weeds comprising applying to the plants or to their locus, an agrochemical composition according to claim 1.

12. A composition according to claim 1, effective for controlling weeds selected from the group of *Alternaria tenella, Brachiaria decumbens, Cyperus rotundus, Digitaria nuda, Eleusine indica, Ipomoea hederifolia, Merremia cissoides.*

13. A kit-of-parts comprising an agrochemical composition according to claim 1.

14. An agrochemical composition consisting of:
a) amicarbazone;
b) a dispersion aid comprising at least one interface additive and a high surface hydrophilicity inert; and,
(c) at least one agrochemically suitable excipient selected from adjuvants, co-solvents, surfactants, colorants, emulsifiers, thickeners, antifreeze agents, biocides, anti-foam agents, stabilizers, wetting agents or a mixture thereof; and,
wherein the interface additive and the high surface hydrophilicity inert are present in ratios from about 1:5 to 5:1;
wherein the composition is in the form of water dispersible granules; and,

wherein said composition further consists of an anionic
surfactant selected from the group consisting of:
sodium lignosulfonate, kraft lignin sulphonate, sodium
polycarboxylate, alkyl or aryl ethoxylates, alkyl and
aryl ethoxylate derivatives, and styrene acrylic poly-
mers.

\* \* \* \* \*

30